United States Patent [19]

Gellenthin, Jr.

[11] Patent Number: 4,864,684
[45] Date of Patent: Sep. 12, 1989

[54] SELF-ATTACHING PANEL CONNECTOR FOR TUBING/HOSES

[75] Inventor: Carl O. Gellenthin, Jr., Houston, Tex.

[73] Assignee: On The Spot America Inc.

[21] Appl. No.: 252,883

[22] Filed: Oct. 3, 1988

[51] Int. Cl.$^4$ ............................................. F16L 5/00
[52] U.S. Cl. .......................................... 16/2; 285/162; 285/192; 403/195; 403/344
[58] Field of Search .................... 16/2, 87.2, 108, 109; 403/195, 197, 344; 285/162, 192, 208, 214; 248/56; 174/656, 152 G, 153 G

[56] References Cited

U.S. PATENT DOCUMENTS

| | | | |
|---|---|---|---|
| 2,945,085 | 7/1960 | Billups | 248/56 X |
| 3,056,852 | 10/1962 | Sachs | 16/2 X |
| 3,424,856 | 1/1969 | Coldren | 16/2 X |
| 4,033,535 | 7/1977 | Moran | 174/153 G X |
| 4,408,924 | 10/1983 | Huebner | 403/344 X |

FOREIGN PATENT DOCUMENTS 254049 of 1948 France ..................... 248/56

Primary Examiner—Fred A. Silverberg

[57] ABSTRACT

A reusable device for connecting hose or tubing to a hole in the panel of machines, vacuum motors, and the like, that can be installed and removed by hand. Installation requires no special skill, tools, or panel preparation, and does not alter the panel in any way. Once installed, hose or tubing can be clamped onto the device by a conventional way. The device consists of three interlocking parts assembled in the order in which they are presented in FIG. 1. Part A is a flexible tubular body with a flange (11) at one end and a slotted section (17) along its length. When the body is squeezed together the diameter of the flange (11) is reduced, allowing it to pass through the hole in the panel. Once inserted into the hole, and the pressure released, the diameter of the flange (11) expands. The flange, once again larger than the diameter of the hole, secures the tubular body in the panel. Part B is an insert that fits into the slotted section (17) of Part A and completes the tubular shape of Part A. The insert prevents the tubular body from being deformed by any pressure on its outer diameter and helps secure the tubular body in the panel. Part C is a tubular ring which snaps into the inner recessed area (14) of Parts A and B. The tubular ring prevents Part B from being pushed out of the slotted section (17) of Part A by any force on its outer diameter. The ring also adds structural support to the device enabling it to support the pressure applied when hose or tubing is clamped onto it by a conventional way.

1 Claim, 1 Drawing Sheet

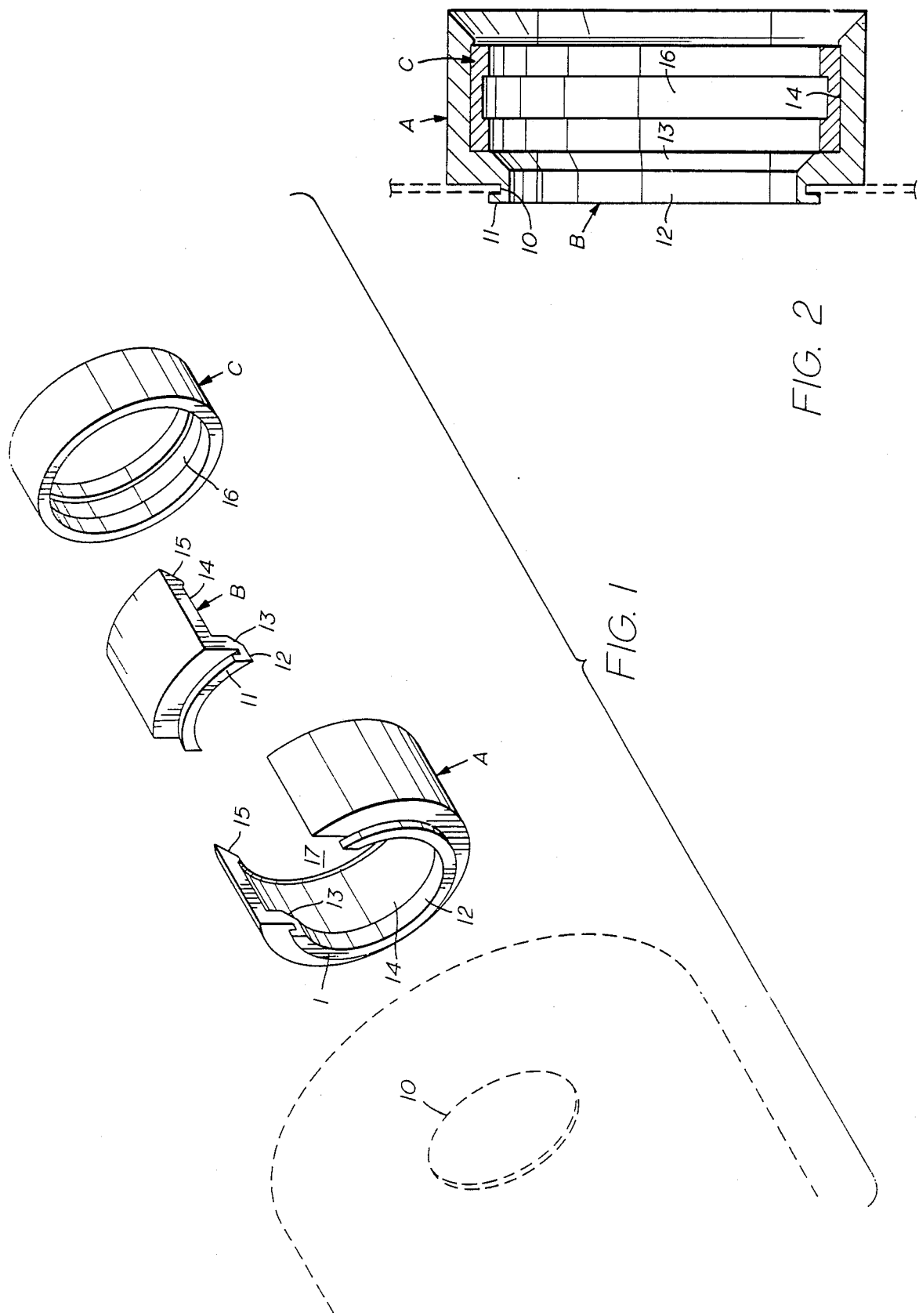

SELF-ATTACHING PANEL CONNECTOR FOR TUBING/HOSES

BACKGROUND—FIELD OF THE INVENTION

The invention relates to hardware and, more particularly, to a device for use in connecting hose or tubing to a hole in a panel.

BACKGROUND—DESCRIPTION OF PRIOR ART

A number of machines in common use require the connection of hose or tubing to a panel. The ability to quickly and easily connect and disconnect a hose or tubing to the panel is a desirable feature from the standpoint of economy, efficiency, and quality control.

Heretofore, the connection of hose or tubing to a panel has been typically accomplished by one of two methods.

One such method is to weld a short piece of tubing to the panel. Then attach the hose to the metal tubing with a hose clamp. This method has a number of disadvantages. In the welding process, the panel can be permanently damaged. Heat generated by the welding can warp the panel, burn the finish off the panel, and actually burn holes in the panel.

The welding method is inefficient and uneconomical. Welding is relatively expensive and significantly increases the cost of the machine. When the machine fails, the welded connector is no longer usable. A replacement machine cannot take advantage of the prior welded connector.

The second method of connecting hose or tubing to a panel is by rivets. In this method, a piece of flanged tubing is placed over the hole in the panel. Holes are drilled through the flange and panel. Then, rivets are inserted into the drilled holes, fastening the flanged tubing to the panel. Again, the hose is clamped to the flanged tubing by a hose clamp.

A major disadvantage of this method is that the rivets, which are typically not uniform in size, may come in contact with and damage components behind the panel; for example, the fan blade in a vacuum motor.

Another disadvantage of the rivet method is that it doesn't hold well. Metal of a machine panel may be thin. The rivets can pull through the metal, producing a large, jagged hole in the panel and loss of integrity in the connection.

The rivet method is inefficient and uneconomical. As in the welding method, when the machine fails, the riveted connector is not reusable.

Consequently, a need exists for a connector which is more suitable to the task, efficient, economical, durable, uniform in quality, easily installed and re-usable.

OBJECTS AND ADVANTAGES

Accordingly, the following are several objects and advantages of my invention:

a. The device provides a quick and easy means of connecting hose or tubing to a hole in a panel.

b. The connection is made with no tools, welding, drilling, or any type of panel alteration.

c. The device is easily installed and removed by hand in a matter of seconds.

d. The device can be used by persons with absolutely no special skill or mechanical aptitude.

e. The device requires no access to the rear of the panel for installation or removal.

f. The device requires only one-sixteenth (1/16") inch of clearance behind the panel.

g. The device is reusable.

h. The use of the device has no effect on the structure or finish of the panel.

i. The device will not disconnect from the panel by itself.

DESCRIPTION OF DRAWINGS

Drawing Figures

FIG. 1 shows an expanded view of the invention in the order in which it is connected to a panel.

FIG. 2 shows a cutaway view of the invention when fully attached to a panel.

DRAWING REFERENCE NUMERALS 10 panel hole
11 flange
12 inside surface of flange
13 rear bevel
14 recessed area
15 front bevel
16 ring groove
17 slotted section

DESCRIPTION OF INVENTION

Part A, the tubular body, is a flexible material e.g. high density polyethylene, machined or molded into a tubular shape the outer diameter of which is governed by the size of the hose or tubing to be attached. The tubular body has a flange 11 with an inside surface 12 at one end and a slotted section 17 along the length of the body. When the tubular body is squeezed by hand, the diameter of the flange becomes small enough to pass through the hole 10 in the panel it is being attached to and secures itself to the panel when the hand pressure is released. The interior of the tubular body has two bevels 13 and 15 to enable smooth air flow through the device. The front bevel 15 also increases the ease with which Part C, the tubular ring, can be inserted. The interior of the tubular body also has a recessed area 14 which houses the tubular ring when the device is fully assembled.

Part B, the tubular insert, is in conformity with the design and material of Part A. Part B is of the size that allows it to fit snuggly into the slotted section 17 of Part A, thus completing the tubular shape of the device.

Part C, the tubular ring, is a rigid or semi-rigid material machined or molded into a ring shape. The outer diameter of Part C allows it to fit snuggly when inserted into the recessed area 14 of Part A and Part B. Part C augments the structural integrity of the device to enable the connection of tubing or hose by conventional clamping means. When the device is fully assembled and attached to a hole 10 in a panel, Part C also prevents Part B from being pushed out of the slotted section 17 of Part A when force is applied to the outside diameter of the device. Part C contains a grooved 16 area along its inner diameter that allows for easy removal with the fingertips of one hand while the fingertips of the other hand apply outward pressure on Part B.

This invention provides for the quick and easy connection of hose or tubing to a panel e.g. vacuum motor. It is also more efficient and economical than any previous connection methods. While the above description contains one major specificity, this should not be construed as a limitation on the scope of the invention, but merely exemplification of the preferred embodiment thereof. Many other variations are possible. For example, skilled artisans will be able to change the dimensions of the device to accommodate various sizes of holes and tubing. They are also able to make the device of molded or machined material.

Accordingly, the scope of the invention should be determined not by the embodiment illustrated, but by the appended claims and their legal equivalents.

OPERATION

The self-attaching panel tubing/hose connector can be attached to a hole in a panel by any able-bodied person without special training and without tools, special preparations, or access to the rear of the panel. The connection is attached by squeezing Part A by hand until the flange at the end of Part A is small enough to pass through the hole in the panel. When Part A is released, the diameter of the flange, which is now behind the panel, expands to become larger than the diameter of the hole and prevents Part A from passing back out through the hole. Part B is then placed by hand into the inner-diameter of Part A, until its flange also clears the hole in the panel, and then snapped into the opening of Part A, completing the form of the Tubular Body. Part C, the tubular ring, is then snapped, by hand, into the recessed area of the inside of the tubular structure formed by Part A and Part B. This completes the assembly process. The insertion of Part C prevents Part B from slipping back out of the slotted area of Part A and provides structural support to the assembly allowing the attachment of hose and/or tubing to the assembly by means of conventional clamping.

The assembly is easily removable. The fingertips of one hand are placed into slot 16 in the inside diameter of Part C. With outward pressure applied on Part B with the fingertips of the other hand Part C can be easily removed from the assembly. Part B is then easily removed by hand from the slotted area of Part A. Part A is then squeezed by hand until the diameter of the flange at the end of Part A becomes smaller than the diameter of the hole in the panel it is attached to. Part A then easily passes back through the hole and the removal is complete. The assembly can be reused many times without refurbishing.

I claim:

1. A three piece tubular assembly for connecting a hose or tubing to a hole in a panel comprising: a one piece tubular body of flexible material, the tubular body having a flange with an inside surface at one end a slotted section along the length of the body, the interior of the tubular body having two bevels with a recessed area therebetween, said two bevels comprising a first bevel adjacent the flanged end a second bevel at the other end; a separate one piece tubular insert of flexible material, said flexible tubular insert having a flange with an inside surface at one end, the interior of the insert having two bevels with a recesses area therebetween, wherein said insert bevels comprising a third bevel adjacent the flanged end and a fourth bevel at the other end, said tubular insert being of the same material and body shape whereby when said insert is fitted snuggly inside the tubular body slotted section, the insert completes the tubular shape of the tubular body; a separate one piece tubular ring fitting snuggly into the recessed area in the tubular body and the tubular insert to increase the structural integrity of the assembly, said tubular ring having a groove in the shape of a ring along its inner surface for aiding the removability of the tubular ring from the recessed area whereby said tubular body is squeezed while being inserted into the panel hole with the flange being behind the panel wall, the tubular inset then being snapped into the slotted opening in the tubular body, the tubular ring then being snapped into the recessed area in the tubular body and the tubular insert, the tubular ring holding the tubular insert in the slotted section of the tubular body.

* * * * *